(No Model.) 2 Sheets—Sheet 1.
E. I. H. E. & J. T. WHITEHOUSE.
DEVICE FOR MAKING PAIL EARS.
No. 245,987. Patented Aug. 23, 1881.
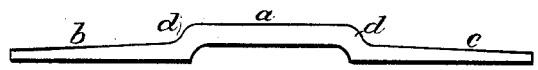
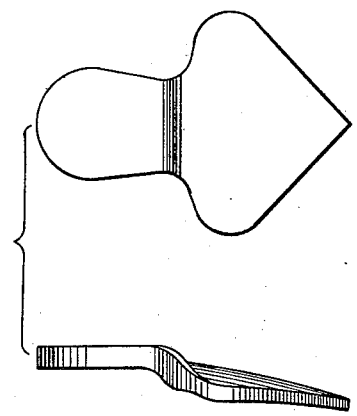
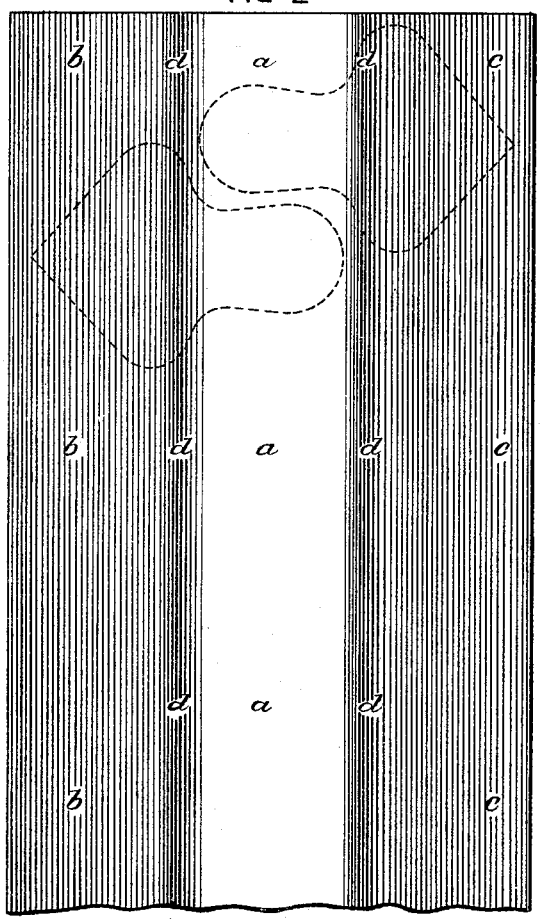
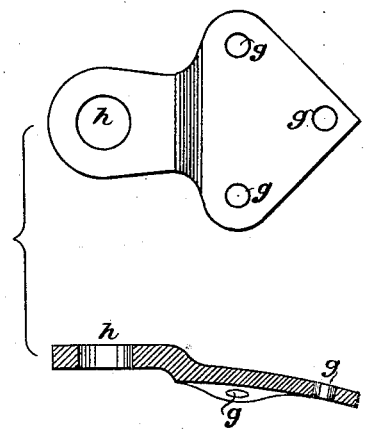
Witnesses,
George Shaw
Richard Merritt
Inventors
Edgar Isaac Henry Edward Whitehouse
Joseph Grubshaw Whitehouse (No Model.) 2 Sheets—Sheet 2.
E. I. H. E. & J. T. WHITEHOUSE.
DEVICE FOR MAKING PAIL EARS.
No. 245,987. Patented Aug. 23, 1881.
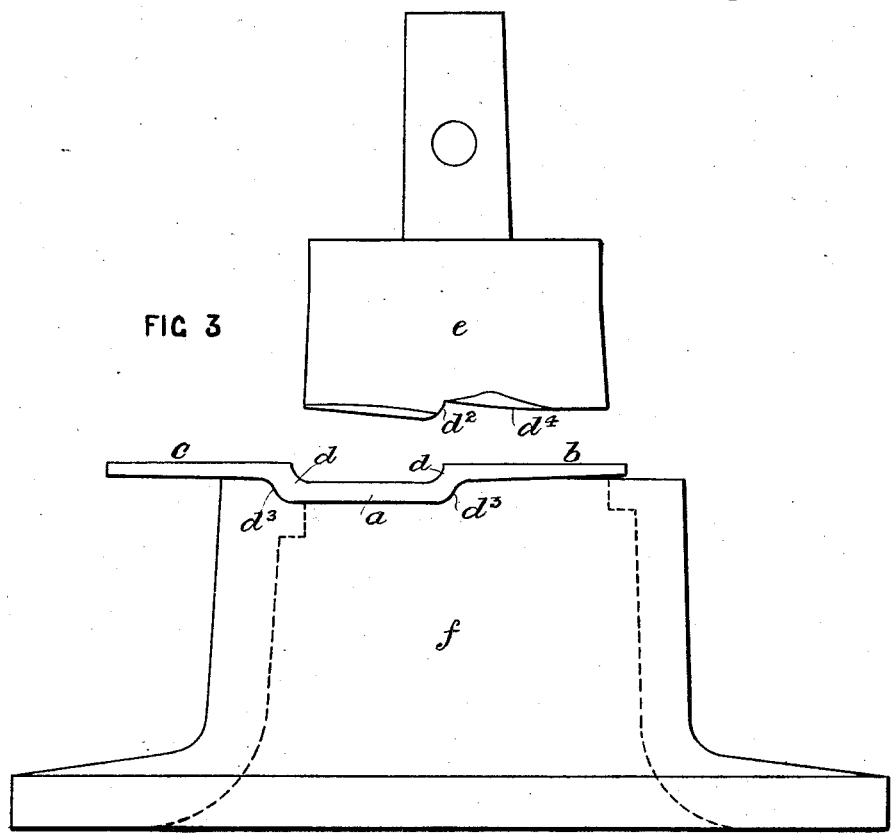
FIG. 3
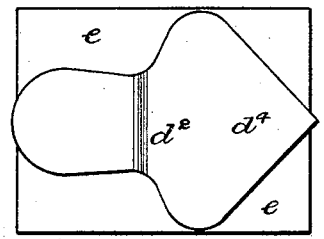
FIG. 4
FIG. 7
FIG. 8
FIG. 9
Witnesses,
George Shaw
Richard Skerrett
Inventors
Edgar Isaac Henry Edward Whitehouse
Joseph Kubshaw Whitehouse

UNITED STATES PATENT OFFICE.

EDGAR I. H. E. WHITEHOUSE AND JOSEPH T. WHITEHOUSE, OF COSELEY, COUNTY OF STAFFORD, ENGLAND.

DEVICE FOR MAKING PAIL-EARS.

SPECIFICATION forming part of Letters Patent No. 245,987, dated August 23, 1881.

Application filed January 18, 1881. (No model.) Patented in England May 13, 1880.

*To all whom it may concern:*

Be it known that we, EDGAR ISAAC HENRY EDWARD WHITEHOUSE and JOSEPH TRUBSHAW WHITEHOUSE, subjects of the Queen of Great Britain, both residing at Coseley, in the county of Stafford, England, have invented certain new and useful improvements in the manufacture of ears for buckets and other vessels and articles having bail-handles, and in tools or apparatus to be employed in the said manufacture, (for which we have received Letters Patent in England, No. 1,976, dated May 13, 1880,) of which the following is a specification.

In the ordinary method of manufacturing the said ears they are made of wrought-iron by hand-forging, or of the annealed cast-iron commonly called "malleable iron" by the process of casting.

In manufacturing the said ears according to our invention we roll strips or bars of iron having in cross-section the figure which the finished ear has in longitudinal section—that is, we roll strips or bars thick on one edge and tapering to the other edge, the said strips or bars being of a breadth equal to the length of the ears to be made, and having a cranked or bent part near their thicker edge, by which that edge is brought into a different plane from that in which the other part of the bar is situated. The planes in which the two parts of the bar are situated are, however, parallel; or strips or bars consisting of two of the taper and cranked bars described, joined at their thick edges, may be employed. By means of a pair of dies or cutting-tools of the requisite shape we cut from the said bars pieces having the figure of the ears to be made. These pieces have the required holes afterward pierced in them. The acting faces of the dies or cutting-tools are not flat, but have the bent figure of the strip or bar to be operated upon; or, instead of rolling the iron of the figure described, it may be rolled without the cranked or bent part described. Iron of this kind may be cut up into partially-formed ears by a pair of plain or flat cutting dies or tools, and the required crank or bend be given by a subsequent operation; or the uncranked bar may be cut up by means of the cutting-tools hereinbefore described, having bent faces. By the action of the said tools the ears are cut out from the uncranked bar, and are cranked as well as cut out by the said cutting dies or tools.

We will now describe with reference to the accompanying drawings the manner in which our invention is to be performed.

Figure 1 represents in end elevation, and Fig. 2 in plan, a rolled strip or bar of iron having the sectional form which we prefer to use in carrying our invention into effect. The said strip or bar consists of a thick middle part, $a$, and thinner side parts, $b\ c$, the said side parts $b\ c$ tapering from the thick middle part, $a$, as seen in Fig. 1. The thick middle part, $a$, of the strip joins the thinner tapering parts $b\ c$ on either side of it by cranked or bent parts $d\ d$, so that the said thin side parts $b\ c$ are situated in a different plane from that in which the middle thick part, $a$, is situated, as exhibited in Fig. 1, where it will be seen that the middle and side parts, $a\ b\ c$, are situated in parallel planes. The combined breadth of the middle thick part, $a$, and the thin tapering side part, $b$ or $c$, is equal to the length of the ears to be made, and the said parts $a\ b$ and $a\ c$ have in cross-section the figure which the finished ear has in longitudinal section.

Fig. 3 represents, in elevation, the pair of dies or tools which we employ for cutting out the partially-made ears from the strip Figs. 1 and 2, or the other strips hereinafter described; and Fig. 4 is a plan of the under face of the upper tool or die. The said dies are marked $e$ and $f$. The upper die, $e$, is carried by the screw or bolt of a press, and the lower die, $f$, is fixed on the bed of the press. The cutting-edges of the two dies $e\ f$ have the figure represented in the plan, Fig. 4. The acting faces of the two dies $e\ f$ are not flat, but have figures nearly the counterpart of the strip, Figs. 1 and 2, to be operated upon—that is to say, across the acting face of the upper die, $e$, is a shoulder, $d^2$, joining the two planes on the face of the die, and in the acting face of the lower die, $f$, is a depression, $d^3\ d^3$, in which the cranked middle part, $a$, of the strip fits during the cutting-out operation. The strip Figs. 1 and 2 being placed on the lower die, $f$, in the position represented in Fig. 3, the upper die,

$e$, is brought down and cuts out from the said strip a partly-made ear, as illustrated in Fig. 5—that is, a piece having the external figure of the finished ear. The part $d^4$ of the upper die, $e$, is made slightly convex on its acting face, so that the partly-made ear, besides being cut out, is also bent, so as to give a slightly-curved figure to that part of the ear which is fixed to the bucket or other vessel. The ear-pieces are cut from the strip in the manner indicated in dotted lines in Fig. 2—that is, a series being cut from the middle part, $a$, and side part, $c$, and the strip being turned endwise, another series is cut from the middle part, $a$, and side part, $b$; or the side parts, $b\ c$, are alternately presented to the part $d^4$ of the upper die, $e$. The cut-out and shaped ear-pieces of the kind represented in Fig. 5 are next pierced with holes, as illustrated in Fig. 6, the holes $g\ g\ g$ being for the purpose of riveting the ear to the bucket or other vessel, and the hole $h$ in the cranked part of the ear forming a loop, in which one end of the bail-handle works, as is well understood. We prefer to pierce the holes $g\ g\ g\ h$ in the ear at one operation by means of a compound punching-tool having four cutting-pegs and holes.

Instead of employing a strip of the sectional form represented in Figs. 1 and 2, a strip of the sectional form represented in Fig. 7 may be used. The strip Fig. 7 is thick on one edge, $a$, and tapers to the other thinner edge, $c$, the two parts $a\ c$ being joined by a cranked or bent part, $d$. Strips of this kind have a breadth equal to the length of the ears to be made.

In carrying our invention into effect strips either of the form of Figs. 1 and 2 or Fig. 7 may be employed, and the ears cut out and shaped from them by the same tools, Figs. 3 and 4. We prefer, however, to use strips of the shape represented in Figs. 1 and 2, as there is less scrap produced than in using strips of the form represented in Fig. 7; or the strips may be rolled of the sectional forms represented in Figs. 8 and 9—that is, without a cranked part or cranked parts. Strips of the sectional forms represented in Figs. 8 and 9 are cut up into partly-formed ears by the use of a plain or flat faced pair of dies or tools, and the required crank or bend is given by a subsequent operation; or the uncranked bars or strips, Figs. 8 and 9, may be cut up and shaped by means of the cutting tools or dies represented in Figs. 3 and 4. By the action of the said tools the ears are cut out from the uncranked strips, and at the same time are cranked and shaped by the said tools into the form represented in Fig. 5. The partly-made ears are cut from the strip Fig. 8, having a thick middle part and tapering edges, in the same way as the ear-pieces are cut from the strip Figs. 1 and 2, so as to avoid as much as possible the making of scrap or waste.

Having now described the nature of our invention and the manner in which the same is to be performed, we wish it to be understood that we claim as our invention of improvements in the manufacture of ears for buckets and other vessels and articles having bail-handles, and in tools or apparatus to be employed in the said manufacture—

1. A rolled bar or plate tapering toward one or both edges, and provided with a thick portion connected with the tapering part or parts by a bend or bends, substantially as described.

2. The cutting-dies described, for forming and shaping bail-ears from strips or bars having substantially the sectional form shown and set forth.

EDGAR ISAAC HENRY EDWARD WHITEHOUSE. [L. S.]
JOSEPH TRUBSHAW WHITEHOUSE. [L. S.]

Witnesses:
GEORGE SHAW,
RICHARD SKERRETT,
*Both of No. 37 Temple Street, Birmingham.*